United States Patent
Park et al.

(10) Patent No.: US 6,987,923 B2
(45) Date of Patent: Jan. 17, 2006

(54) AMPLIFYING OPTICAL FIBER AND METHOD FOR FABRICATING THE SAME

(75) Inventors: Se Ho Park, Kumi-shi (KR); Jin-Seong Yang, Kumi-shi (KR); Mun-Hyun Do, Kyongsangbuk-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 213 days.

(21) Appl. No.: 10/638,985

(22) Filed: Aug. 12, 2003

(65) Prior Publication Data

US 2004/0042759 A1    Mar. 4, 2004

(30) Foreign Application Priority Data

Aug. 28, 2002 (KR) .................. 10-2002-0051146

(51) Int. Cl.
*G02B 6/00* (2006.01)

(52) U.S. Cl. .............. 385/142; 385/127; 385/123; 385/141

(58) Field of Classification Search ........ 385/122–128, 385/141–142

See application file for complete search history.

(56) References Cited

U.S. PATENT DOCUMENTS

| 5,309,452 | A | 5/1994 | Ohishi et al. ............... 372/6 |
| 5,530,709 | A | 6/1996 | Waarts et al. ............... 372/6 |
| 6,272,277 | B1 * | 8/2001 | Heo et al. ................. 385/142 |
| 6,374,641 | B1 | 4/2002 | Chu et al. .................. 65/385 |
| 2004/0190846 | A1 * | 9/2004 | Nakamura et al. ......... 385/123 |

FOREIGN PATENT DOCUMENTS

| EP | 0787694 A1 | 8/1997 |
| JP | 04003482 | 1/1982 |

* cited by examiner

Primary Examiner—Akm Enayet Ullah
Assistant Examiner—Kevin S. Wood
(74) Attorney, Agent, or Firm—Cha & Reiter, L.L.C.

(57) ABSTRACT

Disclosed is an amplifying optical fiber for amplifying optical signal transmitted therethrough by stimulated emission, the amplifying optical fiber comprising: an inner core disposed at a center of said optical fiber and containing MX, $GaS_{3/2}$ and RE; an outer core surrounding said inner core and containing $SiO_2$; and a cladding surrounding said outer core and containing $SiO_2$, wherein said M contained in MX is one component selected from the group consisting of Na, K, Rb and Cs; said X contained in MX is one component selected from the group consisting of F, Cl, Br, and I; and said RE is one component selected from the group consisting of Ce, Pr, Pm, Nd, Sm, Eu, Gd, Tb, Ho, Dy, Er, Tm and Yb.

18 Claims, 7 Drawing Sheets

AMPLIFYING OPTICAL FIBER AND METHOD FOR FABRICATING THE SAME

CLAIM OF PRIORITY

This application claims priority to an application entitled "Amplifying optical fiber and method for fabricating the same," filed in the Korean Intellectual Property Office on Aug. 28, 2002, and assigned Ser. No. 2002-51146, the contents of which are hereby incorporated by reference.

BACKGROUND OF THE INVENTION

1. Field of the Invention

The present invention relates to an optical fiber, and more specifically, relates to an amplifying optical fiber and a method for fabricating the same.

2. Description of the Related Art

While in a trivalent ionic state rare-earth elements, such as, Ce, Pr, Nd, Pm, Sm, Eu, Gd, Tb, Dy, Ho, Er, Tm, and Yb may emit fluorescence by electron transition. An optical fiber containing the rare-earth element may have a function of amplifying an input optical signal by means of a stimulated emission effect. By appropriately regulating reflectance at both ends of the optical fiber, it may also have a function of an optical fiber laser continuously producing the stimulated emission. Typically, within a light communication band, $Pr^{3+}$, $Nd^{3+}$ and $Dy^{3+}$ emit fluorescence in the wavelength range of 1.3 to 1.4 $\mu$m, $Tm^{3+}$ emits fluorescence in the wavelength range of 1.4 to 1.5 $\mu$m, $Er^{3+}$ emits the fluorescence in the wavelength range of 1.5 to 1.6 $\mu$m. Therefore, an $Er^{3+}$ doped optical fiber amplifier is widely used for the wavelength range of 1.5 to 1.6 $\mu$m within a light communication band.

In the wavelength range of 1.5 to 1.6 $\mu$m, an $Er^{3+}$ doped optical fiber amplifier produced by adding $Er^{3+}$ to commonly-used quartz glass optical fiber, is used. However, an optical fiber amplifier for emitting fluorescence in wavelength ranges of 1.3 to 1.4 $\mu$m or 1.4 to 1.5 has not been put to practical use because the fluorescence emitting efficiency of $Pr^{3+}$, $Dy^{3+}$ and $Tm^{3+}$ in quartz glass is too low in those wavelength ranges. As an alternative to avoid those problems, U.S. Pat. No. 5,071,460 entitled "Process for the Preparation of fluoride glass and process for the preparation of optical fiber perform using the fluoride glass", issued to Kazuo Fuziura, and U.S. Pat. No. 5,567,219 entitled "Polyimide coated heavy metal fluoride glass fiber and method of manufacture", issued to Lubos Vacha, disclose a method for fabricating the amplifying optical fiber by adding the rare-earth element to a fluoride glass optical fiber so as to promote the fluorescence emitting efficiency.

However, using the fluoride glass incurs problems in that unlike existing silica glass it can not produce basic glass material with high purity by a chemical vapor deposition method and in that it is difficult to control the refractive index difference between a core and a cladding within the range of 0.1 percent. As an alternative to the problem, a process for fabricating fluoride amplifying optical fiber by using an over-jacketing method is disclosed.

FIGS. 1 and 2 shows the method for fabricating the fluoride amplifying optical fiber by using the over-jacketing method known in the prior art. Referring to FIGS. 1 and 2, one portion corresponding to a core of the amplifying optical fiber is made in the form of a rod 110 and the other portion corresponding to a cladding thereof is made in the form of a tube 120. The rod 110 is inserted into a hole 125 formed in the tube 120 to produce the basic material in the form of a rod. Afterward, by using an elongating apparatus for the fluoride amplifying optical fiber, the fluoride optical fiber is elongated.

On the other hand, U.S. Pat. No. 6,128,430 entitled "Composition for optical waveguide article and method for making continuous clad filament" and U.S. Pat. No. 6,374,641 entitled "Method of making an optical fiber by melting particulate glass in a glass cladding tube", both of which were issued to Polly Wanda Chu, disclose a method comprising a step of fluorinating a quartz glass component in quartz tube, in other words, substituting the quartz to be used as core component with fluoride, so as to improve the fabricating process.

FIG. 3 illustrates a view of a fluoride amplifying optical fiber known in the prior art. The fluoride amplifying optical fiber 200 comprises a core 210 disposed at a center of the fiber and a cladding 220 surrounding the core 210. As can be appreciated from a refractive index distribution curve 230, because there is a significant refractive index difference between the core 210 and the cladding 220, a problem occurs in that optical signals transmit in a multi-mode 240, 250. If a core diameter A of the fluoride amplifying optical fiber 200 is reduced below 4 $\mu$m in order to transmit the optical signal in a single mode, coupling loss increases significantly when the fluoride amplifying optical fiber is coupled to the quartz amplifying optical fiber, the diameter of which is typically 8 $\mu$m.

As stated above, the amplifying optical fiber known in the prior art includes problems outlined below.

First, when transmitting through the amplifying optical fiber having a refractive index difference between the core and the cladding, light waves transmit in a multi mode.

Second, if the core diameter of the fluoride amplifying optical fiber is reduced below 4 $\mu$m, when coupled to the quartz optical fiber for transmitting light, coupling loss increases greatly.

Third, because the O—H chemical bond in the fluoride glass increases when the fluoride glass is exposed to moisture, light-wave loss increases and the mechanical strength of the optical power decreases, and thus reliability of the amplifying optical fiber deteriorates.

Fourth, when quartz glass is substituted with fluoride glass, a problem occurs in that light scattering loss resulting from oxi-fluoride core composition increases significantly.

SUMMARY OF THE INVENTION

The present invention provides an amplifying optical fiber that minimizes coupling loss by maintaining the diameter of a core at 8 $\mu$m and transmits light in a single mode.

An embodiment of the present invention provides an amplifying optical fiber in which light-wave loss is not increased and mechanical strength is maintained even when an amplifying optical fiber is exposed to humidity.

An embodiment of the present invention provides an amplifying optical fiber which improves fluorescence emitting efficiency and light amplification efficiency.

An embodiment of the present invention provides an amplifying optical fiber in which light dispersion loss is reduced.

An embodiment of the present invention provided a method for fabricating the amplifying optical fiber that achieves the above-stated objects.

The present invention provides an amplifying optical fiber for amplifying an optical signal transmitted therethrough by stimulated emission, the amplifying optical fiber comprising: an inner core disposed at a center of said optical fiber and containing MX, $GaS_{3/2}$ and RE; an outer core surrounding said inner core and containing $SiO_2$; and a cladding surrounding said outer core and containing $SiO_2$, wherein said M contained in MX is one component selected from the group consisting of Na, K, Rb and Cs; said X contained in MX is one component selected from the group consisting of F, Cl, Br, and I; and said RE is one component selected from the group consisting of Ce, Pr, Pm, Nd, Sm, Eu, Gd, Tb, Ho, Dy, Er, Tm and Yb.

DETAILED DESCRIPTION OF THE PREFERRED EMBODIMENTS

Hereinafter, embodiments of the present invention are described with reference to the accompanying drawings. For the purposes of clarity and simplicity, a detailed description of known functions and configurations incorporated herein is omitted when it may make the subject matter of the present invention rather unclear.

Figure 1:
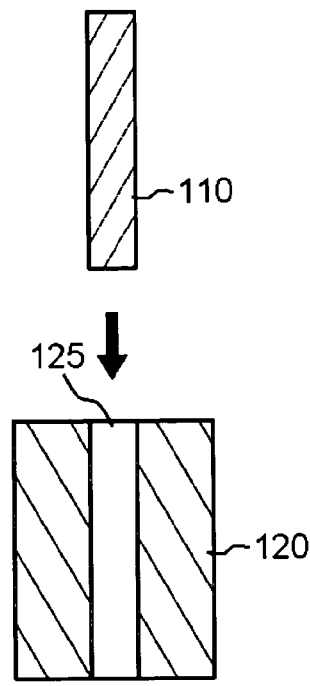
FIGS. 1 and 2 illustrate a conventional method for fabricating a fluoride amplifying optical fiber by an overjacketing method.
Figure 2:
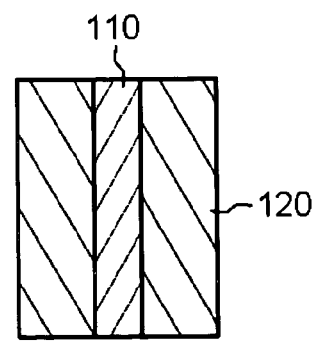
Figure 3:
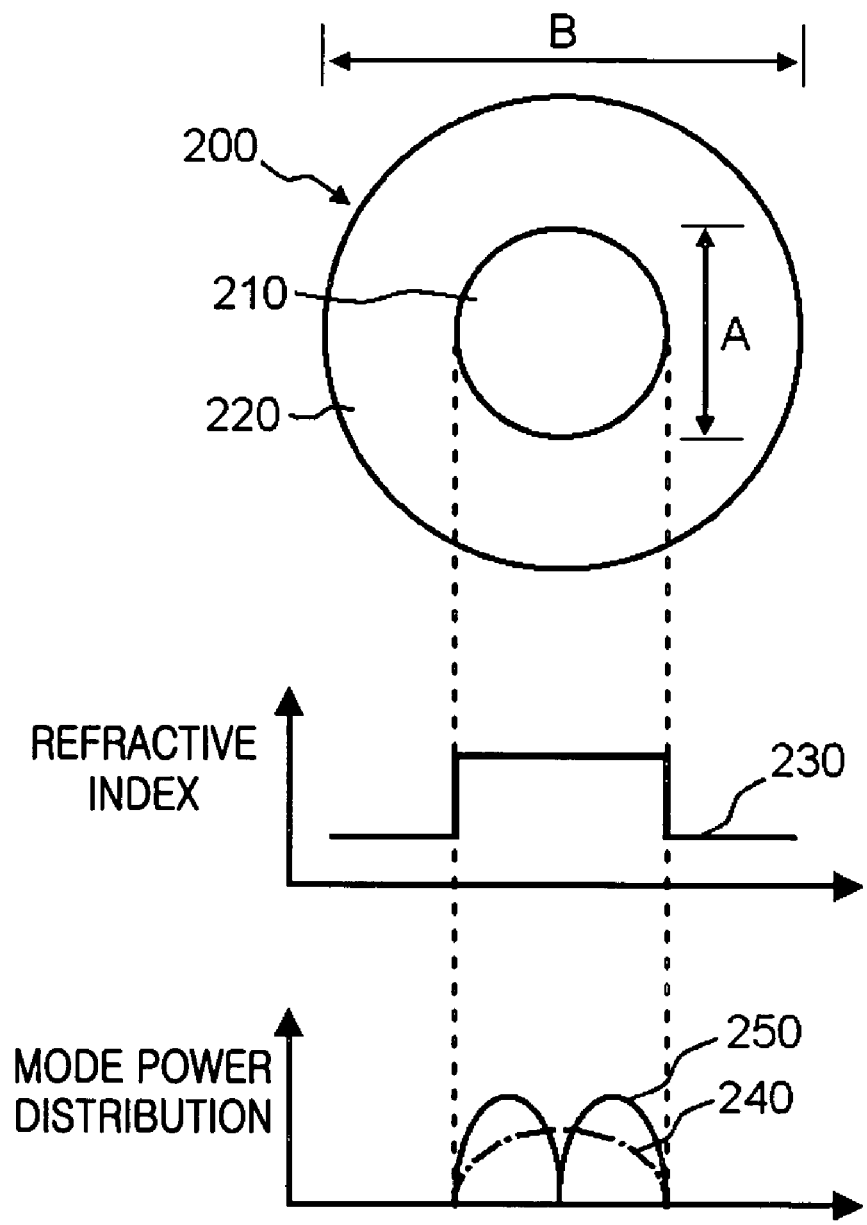
FIG. 3 illustrates a conventional fluoride amplifying optical fiber.
Figure 4:
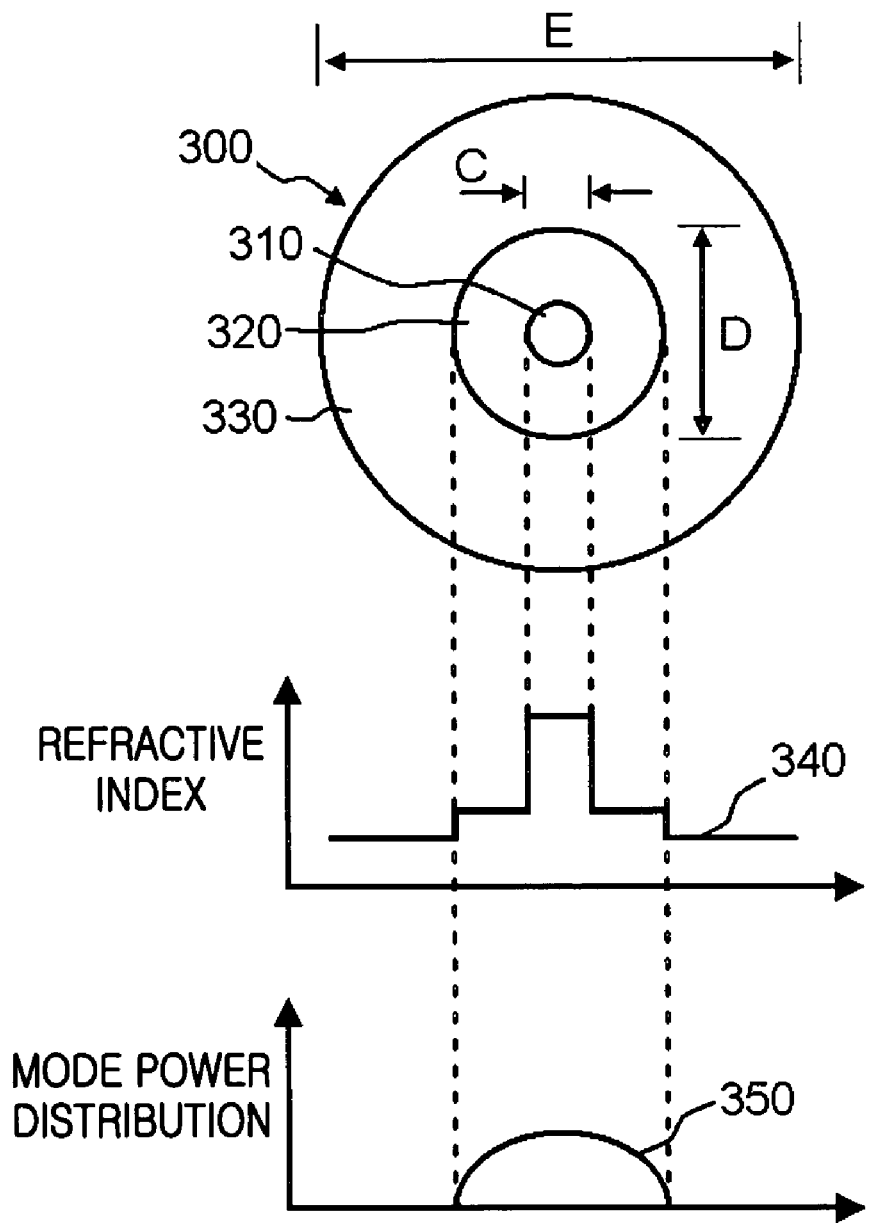
FIG. 4 illustrates an amplifying optical fiber according to the present invention.

FIG. 4 shows an amplifying optical fiber according to the present invention. The amplifying optical fiber 300 comprises an inner core 310 disposed at the center of said amplifying optical fiber 300, an outer core 320 surrounding said inner core 310 and a cladding surrounding said outer core 320.

The inner core has a diameter C in the range of 0.1 to 8 $\mu$m and may contain MX in the range of 5 to 67 mole %, $GaS_{3/2}$ in the range of 5 to 50 mole %, and RE in the range of 0.001 to 5 mole %. Also, it may further comprise one of the following: Ge in an amount greater than 0 and less than or equal to 33 mole %, As in an amount greater than 0 and less than or equal to 40 mole %, S in an amount greater than 0 and less than or equal to 67 mole % and $LaS_{3/2}$ in an amount greater than 0 and less than or equal to 50 mole %. M contained in said MX may be one component selected from a group consisting of Na, K, Rb, and Cs. X contained in said MX may be one component selected from a group consisting of F, Cl, Br and I. Also, RE is a rare-earth element and may be one component selected from a group consisting of Ce, Pr, Pm, Nd, Sm, Eu, Gd, Tb, Ho, Dy, Er, Tm and Yb.

The outer core 320 has a diameter D in the range of 2 to 10 $\mu$m and may comprise $SiO_2$ in the range of 30 to 100 mole %. Also, it may further comprise one of the following $B_2O_3$ in an amount greater than 0 and less than or equal to 30 mole %, $P_2O_5$ in an amount greater than 0 and less than or equal to 10 mole %, $Al_2O_3$ in an amount greater than 0 and less than or equal to 10 mole %, $GeO_2$ in an amount greater than 0 and less than or equal to 30 mole %, PbO in an amount greater than 0 and less than or equal to 40 mole % and $SiF_4$ in an amount greater than 0 and less than or equal to 10 mole %.

The cladding 330 has a diameter E in the range of 100 to 250 $\mu$m and may comprise $SiO_2$ in the range of 30 to 100 mole %. Also, it may further comprise one of following $B_2O_3$ in an amount greater than 0 and less than or equal to 30 mole %, $P_2O_5$ in an amount greater than 0 and less than or equal to 10 mole %, $Al_2O_3$ in an amount greater than 0 and less than or equal to 10 mole %, $GeO_2$ in an amount greater than 0 and less than or equal to 30 mole %, PbO in an amount greater than 0 and less than or equal to 40 mole % and $SiF_4$ in an amount greater than 0 and less than or equal to 10 mole %. The difference $\Delta n$ of the refraction index between the outer core 320 and the cladding 330 is established to be in the range of 0.001 to 10% and preferably to be below 2%. Alternately, the difference $\Delta n$ of the refraction index between the inner core 310 and the outer core 320 is set to be below 2%. In this case, the diameter C of the inner core 310 is set to be in the range of 1 to 8 $\mu$m.

FIGS. 5 to 9 illustrate explanatory views of a method for fabricating basic material for amplifying optical fiber according to the present invention. The method for fabricating basic material for amplifying optical fiber comprises steps of forming an outer core, supplying raw material, forming an inner core and collapsing a tube.

Figure 5:
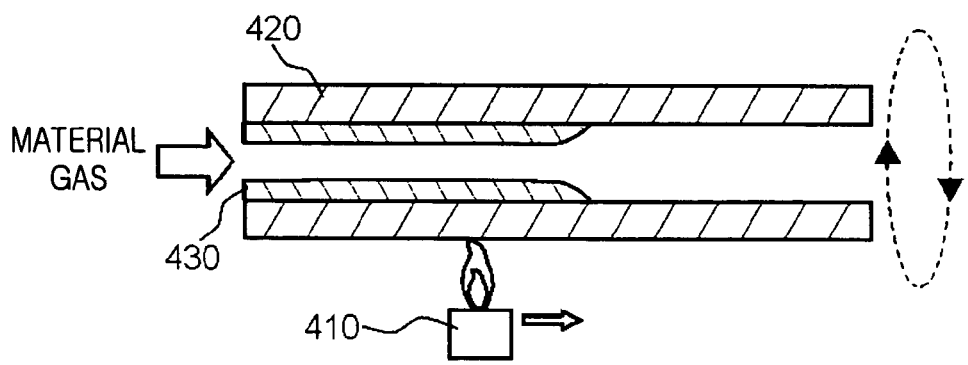
FIGS. 5 to 9 illustrates an explanatory view of a method for fabricating basic material of the amplifying optical fiber according to the present invention.
Figure 6:
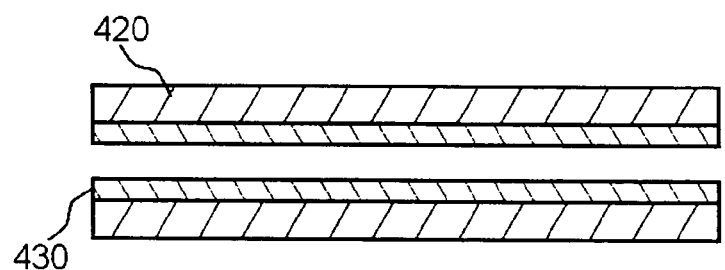

The step of forming the outer core is a process for forming the outer core 430 on the inner wall of the quartz tube 420 for a cladding by means of the chemical vapor deposition method. Referring to FIG. 5, the outer wall of the quartz tube 420 is heated by a heating source, such as an oxygen/hydrogen burner while material gas for the outer core is impregnated into the quartz tube 420. Here, the quartz tube 410 is rotated and the heating source 410 moves along the longitudinal direction of the quartz tube 410. As the quartz tube 420 is heated, a high temperature zone is formed inside the quartz tube 420. The material gas passing through the high temperature zone, produces reaction material, and the reaction material is deposited onto the inner wall of the quartz tube 430 to form the outer core 430. Chemical vapor deposition methods comprise MCVD (modified chemical vapor deposition), PECVD (plasma enhanced chemical vapor deposition). Alternatively, there may be a method for forming an integrated tube in that tubes for use as a cladding and as a outer core are respectively produced by means of either an extrusion or an elongation, the tube for use as the outer core is inserted into the tube for use as the cladding and then those quartz tubes are melted and bonded to each other by heating the outer wall of the quartz tube being used as the cladding. FIG. 6 shows a quartz tube 420 with the outer core 430 formed on the inner wall thereof according to the above-mentioned step of forming the outer core.

Figure 7:
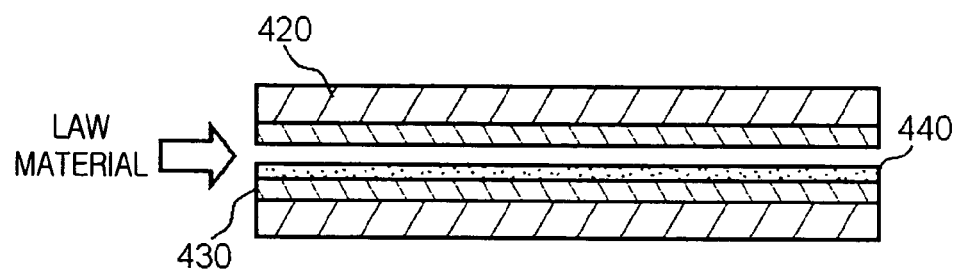

The above-mentioned step of supplying raw material is a process for supplying the raw material 440 for the inner core into the quartz tube 420. The raw material is produced in such a manner that raw material elements, such as, MX, $GaS_{3/2}$, RE, etc., are melted in a separate container made of quartz material in order to prevent them from coming in contact with $O_2$ and then are rapidly cooled. FIG. 7 shows that the raw material 440 in the form of powder, grain or rod with a diameter in the range of 0.001–10 $\mu$m is supplied into said quartz tube 420.

Figure 8:
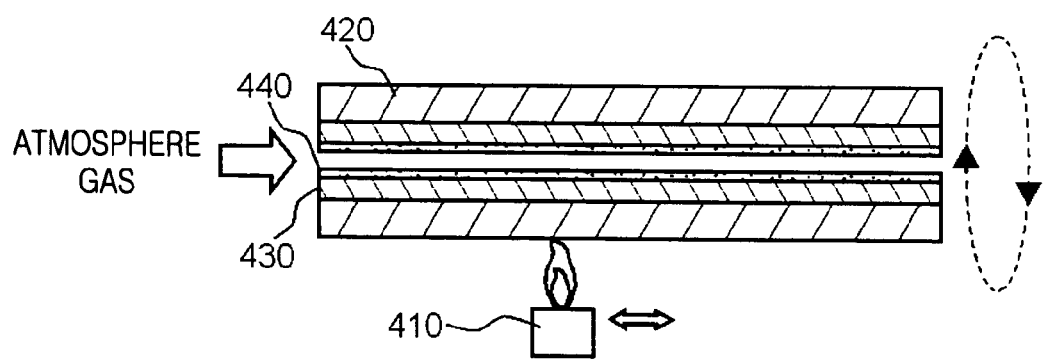

The above-mentioned step of forming the inner core is a process for forming the raw material 440 contained in said quartz tube 420. Referring to FIG. 8, the outer surface of the quartz tube 420 is heated to a predetermined heating temperature as the quartz tube 420 is rotated in about its axis.

The heating temperature must be lower than a softening point of the quartz tube and greater than a melting point of the raw material 440. As the quartz tube 440 is heated, the melted raw material 440 adheres to the surface of the inner core 430 with a uniform thickness. At the same time, the atmosphere gas, that comprise at least two selected from the group consisting of He, Ne, Ar, Xe, $N_2$, $F_2$ $Cl_2$, $Br_2$, $I_2$, is supplied into the quartz tube 420.

Figure 9:
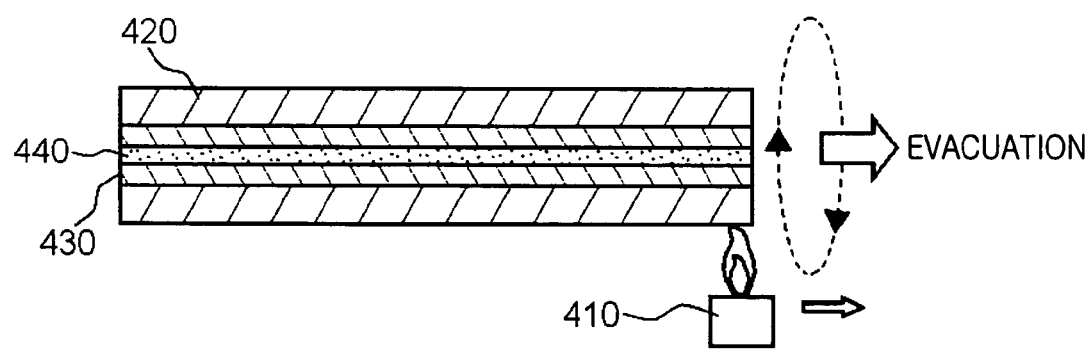

The above-mentioned step of collapsing a tube is a process for collapsing the quartz tube 420 to remove vacant space in the quartz tube 420. Referring to FIG. 9, the quartz tube 420 is heated above the softening temperature thereof and the vacant space in the quartz tube 420 is kept at a lower pressure, so that there occurs a pressure difference between the interior and the exterior of the quartz tube 420. As a result, the quartz tube 420 collapses inward toward the axis of the tube its interior vacant space is removed, so that the basic material for an amplifying optical fiber is produced in a form of rod.

Afterward, the method proceeds to a step of elongating the amplifying optical fiber. The basic material for the amplifying optical fiber fabricated by the above-described method is loaded onto an apparatus for elongating the optical fiber so that one end of the optical fiber may be melted and elongated. The elongated optical fiber is coated with ultraviolet-hardening resin or thermosetting resin and its outer crust is formed by hardening said resin by ultraviolet rays or heating. The outer crust thus formed increases the mechanical strength of the amplifying optical fiber, protecting it against the external environment.

The amplifying optical fiber according to the present invention may be diversely embodied depending on its components and many kinds of its embodiments are shown in Table 1 and Table 2.

TABLE 1

| Composition (mole %) | | Embodiment I | Embodiment II | Embodiment III | Embodiment IV |
|---|---|---|---|---|---|
| Inner core | Ge | 17.5 | 15 | 12.5 | 10 |
| | As | 7 | 6 | 5 | 4 |
| | S | 45.5 | 39 | 32.5 | 26 |
| | CsBr | 15 | 20 | 25 | 30 |
| | $GaS_{3/2}$ | 14 | 19 | 24 | 30 |
| | $LaS_{3/2}$ | 1 | 1 | 0 | 0 |
| | Tm | 0.1 | 0.1 | 0.1 | 0.1 |

Table 1 shows figures representing components of the inner core in each embodiment. Table 2 shows figures representing formulation of the outer core and cladding commonly applied to each embodiment.

TABLE 2

| Composition | $SiO_2$ | $B_2O_3$ | $P_2O_5$ | $AL_2O_3$ | $GeO_2$ | PbO | $SiF_4$ |
|---|---|---|---|---|---|---|---|
| Outer core | 70 | 17 | 3 | 2 | 2 | 5 | 1 |
| Cladding | 70 | 17 | 5 | 2 | 2 | 3 | 1 |

Embodiment IV of Table 1 is detailed below by way of example only, along with the measured results with respect to that embodiment.

A Representative Embodiment

Referring to FIG. 4, an amplifying optical fiber 300 according to the present invention, comprises an inner core 310, an outer core 320 and a cladding 330. The components of the amplifying optical fiber 300 are shown in Table 1 and Table 2. The inner core 310 has a diameter C of 0.6 $\mu$m and a refractive index of 1.58. The outer core 320 has a diameter D of 8 $\mu$m and a refractive index of 1.4590. The cladding 330 has a diameter E of 125 $\mu$m and a refractive index of 1.45701. The amplifying optical fiber 300 has a numerical aperture (NA) of 0.076, a mode field diameter (MFD) of 9.25 $\mu$m at the wavelength of 1.45 $\mu$m, and a coupling loss of 0.9 dB when coupled to a transmitting optical fiber. Though the numerical aperture (NA) of the amplifying optical fiber 300 is smaller than that of the transmitting optical fiber being 0.117, a coupling loss of less than 1 db can be achieved because the mode field diameter (MFD) of the amplifying optical fiber is nearly coincident with that of the transmitting optical fiber by more than 90%. Also, the amplifying optical fiber 300 has a transmitting loss of 0.13 dB/m at a wavelength of 1.45 $\mu$m and a color dispersion of 0.080 ps/nm.m. Through this amplifying optical fiber, a light signal with a wavelength of 1.45 $\mu$m transmits in a single mode 350. The cut-off wavelength in the single mode is 1.2 $\mu$m and bending loss is 0.2 dB/km at a wavelength of 1.651 $\mu$m.

Even though this amplifying optical fiber 300 has a transmission loss that is somewhat greater than the 0.1 dB/m loss of the fluoride optical fiber known in the prior art, it is appropriate for purposes of use in an optical fiber amplifier or an optical fiber laser when considering that a length of optical fiber used in an optical fiber amplifier or an optical fiber laser is in a range of 20–40 m. Also, while the fluoride optical fiber of the prior art has problems in that only a mechanical coupling to a transmitting quartz optical fiber is possible, the coupling loss is greater than 1 dB and that, due to high reproducibility, is not enough; the amplifying optical fiber 300 according to the present invention makes it possible to obtain high reproducibility and low coupling loss because a fusion splicing to the transmitting quartz optical fiber is possible. Furthermore, because the inner core is protected by the cladding 330 and the outer core 320 made from chemically stabilized quartz glass even when the outer crust (not shown), i.e., the polymer coating layer is removed for coupling, O—H chemical bonding of the inner core 310 resulting from exterior humidity is kept to a minimum. In the amplifying optical fiber 300, since the transmission of an optical signal is achieved mostly through the outer core 320 and the stimulated emission occurs only through the inner core 310, optical loss is minimized even in a state in which the inner core 310 is partially damaged by O—H chemical bonding.

Figure 10:
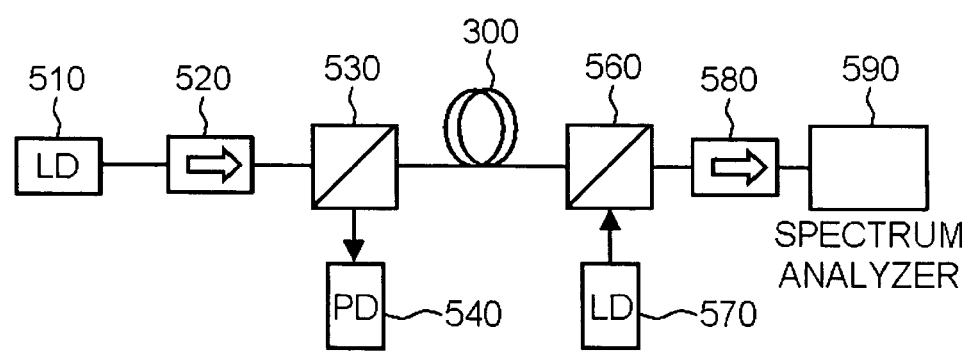
FIG. 10 illustrates a construction of an optical amplification gain measuring device.
Figure 11:
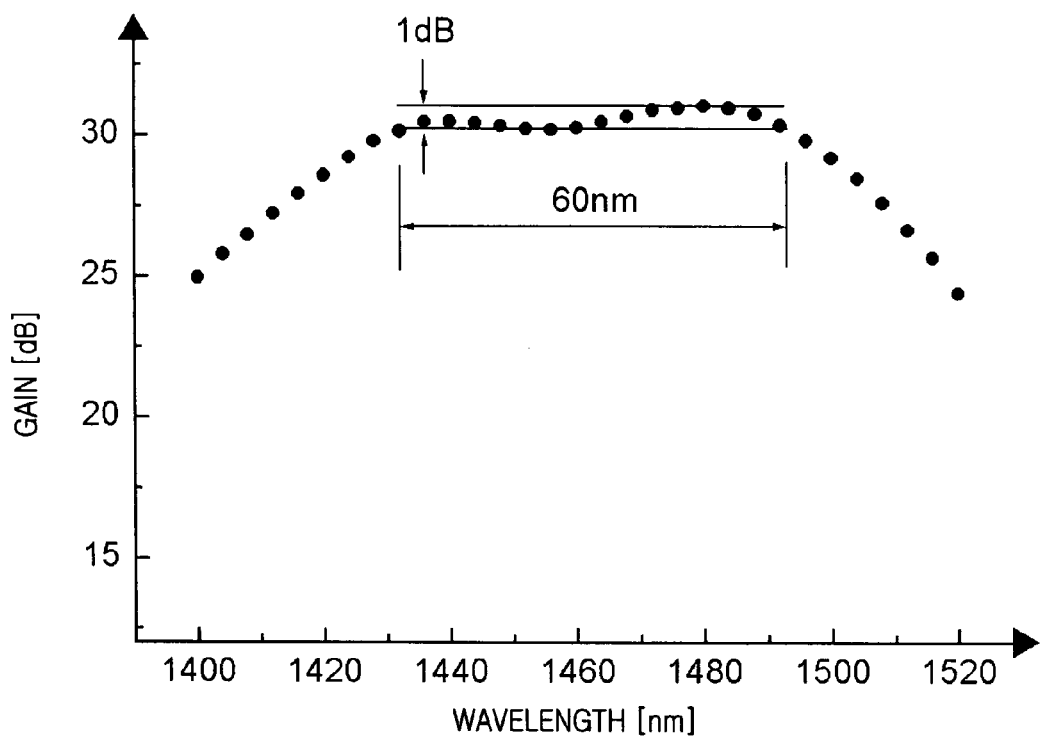
FIG. 11 illustrates an optical amplification gain spectrum measured by the measuring device shown in FIG. 10.

FIG. 10 illustrates diagrammatically a structure of an apparatus for measuring optical amplification gain and FIG. 11 illustrates an optical amplification gain spectrum measured by the apparatus illustrated in FIG. 10. The apparatus comprises a wavelength variable type laser diode 510, first and second optical couplers 530 and 560, a pumping laser diode 570, a photodiode 540, first and second isolators 520 and 580, and a spectrum analyzer 590. Between the first and the second optical couplers 530 and 560, amplifying optical fiber 300 according to the present invention is disposed for coupling.

The wavelength variable type laser diode 510 outputs an optical signal in a wavelength range of 1.45 to 1.5 $\mu$m and the pumping laser diode 570 produces a pumping light of 400 mW at a wavelength of 0.8 $\mu$m. The output of the optical signal measured by the photodiode 540 is −30 dBm and the length of the amplifying optical fiber 300 is 20 m. Referring to FIG. 11, the optical amplification gains above 30 dB are measured in a wavelength band of 60 nm in which gains are leveled. Accordingly, with the use of said amplifying optical fiber 300, it is possible to achieve the $Tm^{3+}$-doped optical fiber amplifier (TDFA) for amplifying optical signals of the S band (corresponding to a wavelength range of 1.45 to 1.5 $\mu$m).

As described above, the amplifying optical fiber according to the present invention has an advantage in that it can further reduce the difference in refractive index between the outer core and the cladding compared to that of the prior art, so that the optical signal can emit in a single mode.

Also, the amplifying optical fiber according to the present invention has another advantage in that the optical loss due to an intrusion of humidity can be minimized because the inner core is protected by the outer core and the cladding made from chemically stabilized quartz.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An amplifying optical fiber for amplifying optical signal transmitted therethrough by stimulated emission, comprising:
   an inner core disposed at a center of said optical fiber and comprising MX, $GaS_{3/2}$ and RE;
   an outer core surrounding said inner core and containing $SiO_2$; and
   a cladding surrounding said outer core and containing $SiO_2$, wherein said M contained in MX is one component selected from the group consisting of Na, K, Rb and Cs;
   said X contained in MX is one component selected from the group consisting of F, Cl, Br, and I; and
   said RE is one component selected from the group consisting of Ce, Pr, Pm, Nd, Sm, Eu, Gd, Tb, Ho, Dy, Er, Tm and Yb.

2. An amplifying optical fiber as claimed in claim 1, wherein said inner core further comprises Ge, As, and S.

3. An amplifying optical fiber as claimed in claim 2, wherein said inner core further comprises $LaS_{3/2}$.

4. An amplifying optical fiber as claimed in claim 3, wherein said inner core has a diameter in the range of 0.1 to 8 $\mu$m.

5. An amplifying optical fiber as claimed in claim 4, wherein said inner core comprises Mx of 5 to 67 mole %, $GaS_{3/2}$ of 5 to 50 mole %, and RE of 0.001 to 5 mole %.

6. An amplifying optical fiber as claimed in claim 5, wherein said inner core further comprises one component selected from the group consisting of 0<mole %<=33 of GE, 0<mole %<=40 of As, 0<mole %<=67 of S, and 0<mole %<=50 of $LaS_{3/2}$.

7. An amplifying optical fiber as claimed in claim 3, wherein:
   said outer core further comprises $SiF_4$; and
   said cladding further comprises $SiF_4$.

8. An amplifying optical fiber as claimed in claim 7, wherein:
   said outer core further comprises $Al_2O_3$ and $GeO_2$; and
   said cladding further comprises $B_2O_3$ and $P_2O_5$.

9. An amplifying optical fiber as claimed in claim 8, wherein said outer core has a diameter in the range of 2 to 10 $\mu$m.

10. An amplifying optical fiber as claimed in claim 9, wherein said cladding has a diameter in the range of 100 to 250 $\mu$m.

11. An amplifying optical fiber as claimed in claim 3, wherein said outer core has a diameter in the range of 2 to 10 $\mu$m.

12. An amplifying optical fiber as claimed in claim 11, wherein said outer core comprises $SiO_2$ of 30 to 100 mole %.

13. An amplifying optical fiber as claimed in claim 12, wherein said outer core further comprises one component selected from the group consisting of 0<mole %<=30 of $B_2O_3$, 0<mole %<=10 of $P_2O_5$, 0<mole %<=10 of $Al_2O_3$, 0<mole %<=30 of $GeO_2$, 0<mole %<=40 of PbO, and 0<mole %<=10 of $SiF_4$.

14. An amplifying optical fiber as claimed in claim 3, wherein said cladding has a diameter in the range of 100 to 250 $\mu$m.

15. An amplifying optical fiber as claimed in claim 14, wherein said cladding comprises $SiO_2$ of 30 to 100 mole %.

16. An amplifying optical fiber as claimed in claim 15, wherein said cladding core further comprises one component selected from the group consisting of 0<mole %<= 30 of $B_2O_3$, 0<mole %<=10 of $P_2O_5$, 0<mole %<=10 of $Al_2O_3$, 0<mole %<=30 of $GeO_2$, 0<mole %<=40 of PbO, and 0<mole %<=10 of $SiF_4$.

17. A network comprising optical fiber according to claim 1.

18. An optical fiber amplifier comprising optical fiber according to claim 1.

* * * * *